United States Patent [19]

Brearley et al.

[11] Patent Number: 5,004,300

[45] Date of Patent: Apr. 2, 1991

[54] ELECTRONIC BRAKING SYSTEM

[75] Inventors: Malcolm Brearley, Solihull; Richard B. Moseley, Leamington Spa, both of England

[73] Assignee: Lucas Industries Public Limited Company, Birmingham, England

[21] Appl. No.: 489,037

[22] Filed: Mar. 6, 1990

[30] Foreign Application Priority Data

Mar. 8, 1989 [GB] United Kingdom ............. 8905311.0

[51] Int. Cl.$^5$ .......................... B60T 8/32; B60T 8/88
[52] U.S. Cl. ....................... 303/15; 303/40; 303/92; 303/118; 303/119; 303/100; 303/111
[58] Field of Search ................... 303/92, 15, 118, 119, 303/28, 40, 111, 13, 14, 100, 16, 17, 6.01, 7, 20, 8, 9.61, 9.63, 86

[56] References Cited

U.S. PATENT DOCUMENTS

| | | |
|---|---|---|
| 4,175,795 | 11/1979 | Mortimer et al. .................. 303/118 |
| 4,712,839 | 12/1987 | Brearley et al. .................. 303/15 X |
| 4,743,072 | 5/1988 | Brearley ............................. 303/15 |
| 4,795,219 | 1/1989 | Brearley et al. ............... 303/100 X |
| 4,861,115 | 8/1989 | Peterson .......................... 303/28 X |

*Primary Examiner*—Douglas C. Butler
*Attorney, Agent, or Firm*—Scrivener and Clarke

[57] ABSTRACT

A vehicle braking system wherein, for avoiding serious brake unbalance under fault conditions which would cause either loss of braking or excessive braking at one wheel, a small bore link pipe is arranged to connect the pressure control elements, for example solenoid actuated relay valves, of respective brake circuits associated with the two wheels at opposite ends of an axle whereby the pressure control elements in each electronically controlled pressure adjustment channel are influenced in such a manner that a correctly functioning channel attempts to influence a faulty channel in such a direction as to reduce the pressure unbalance.

10 Claims, 5 Drawing Sheets

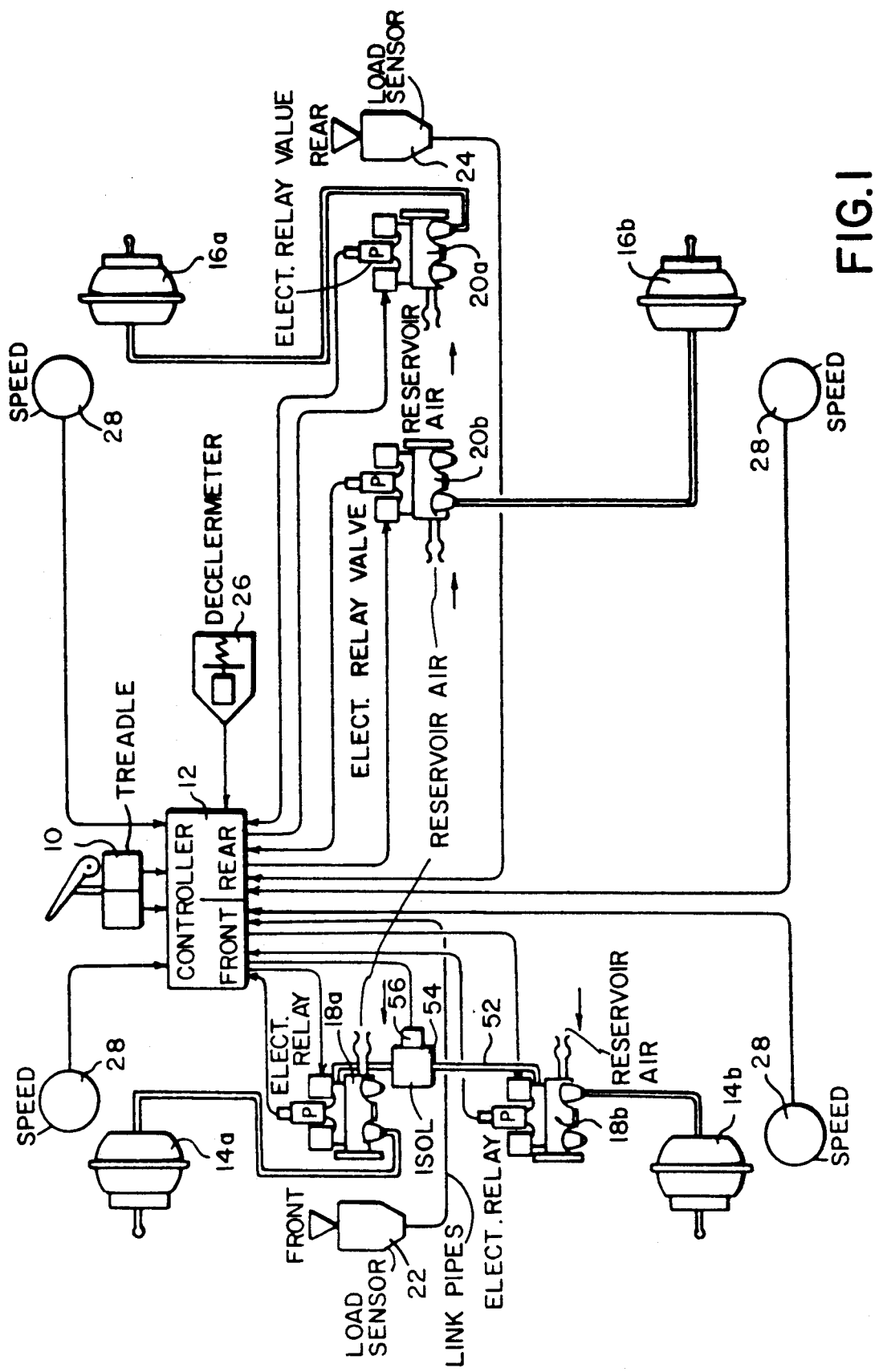

ELECTRONIC BRAKING SYSTEM

The present invention relates to electronic braking systems (EBS) for wheeled vehicles; and is concerned in particular with the monitoring of the pressure control means in such systems.

In an electronic braking system (EBS) typically as described in our European Patent Application Nos. 86303997.0 and 86303998.8 there is provided a braking pressure control means which is itself controlled electronically in relationship to the drivers braking demand (established normally by a foot-operated transducer) to set the braking pressures individually for each axle of the vehicle or, in cases where antilock control is to be incorporated, individually for each wheel or on the largest vehicles, some combination of these control levels. The EBS sets and controls braking pressures in response to the driver's demands by the use of pressure control loops.

An object of the present invention is to provide a means of avoiding serious brake unbalance under fault conditions which would cause either loss of braking or excessive braking at one wheel.

In accordance with a first aspect of the present invention there is provided a vehicle braking system in which a respective electronically controlled pressure adjustment channel having a local pressure control element is provided for each wheel and wherein for avoiding serious brake unbalance under fault conditions which would cause either loss of braking or excessive braking at one wheel, the system includes a link pipe which connects the pressure control elements of the respective brake circuits associated with the two wheels at opposite ends of an axle whereby the pressure control elements are influenced in such a manner that a correctly functioning channel attempts to influence a faulty channel in such a direction as to reduce the pressure unbalance.

Preferably, the pressure control elements are solenoid actuated relay valves and the link pipe is a small bore connection between the relay valve control chambers.

The link pipe can be equipped with either one or two isolating valves which are solenoid operated so that, in the event of skidding being detected, the solenoids are signalled to disable the link and allow individual control of braking pressure at each wheel.

Advantageously, the disablement of the linking means during any braking operation is prevented if any pressure control fault has been detected at either wheel by additional fault detection means.

Advantageously, the link means is arranged to have carefully selected restriction so that valve failure will generate a detectable difference in braking input, typically as measured in pressure terms, when a failure exists at one of the braking control channels.

The invention is described further hereinafter, by way of example only, with reference to the accompanying drawings, in which:

FIG. 1 is a diagrammatic representation of one embodiment of an EBS incorporating a first measure in accordance with the present invention;

Figure 2A:
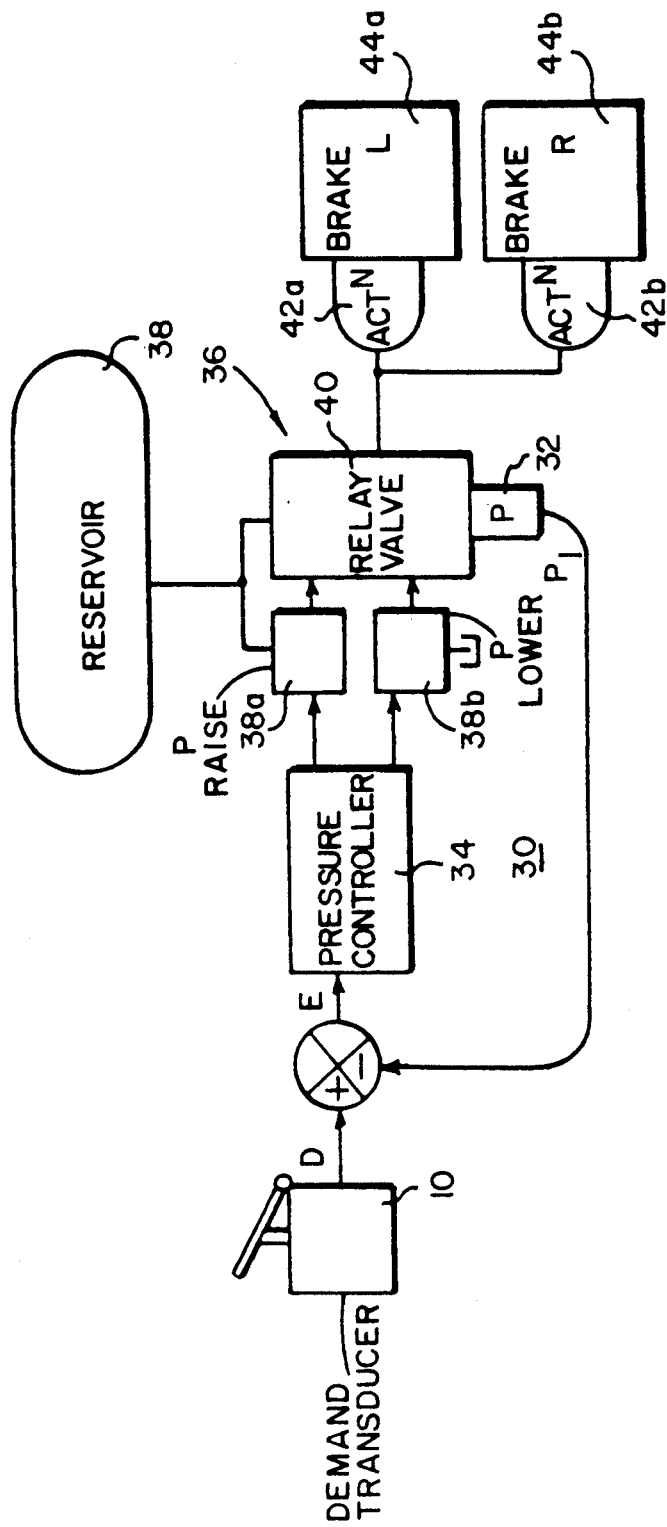
FIG. 2a shows a typical pressure control loop.

FIG. 1 illustrates, inter alia, the main components of a conventional electronic braking system (EBS) which is not described in detail herein. Driver's braking demand signals are generated electrically by a treadle-operated transducer arrangement 10 and supplied to an electronic controller 12 where front and rear braking pressures are established and fed to left and right front 14a, 14b, and left and right rear 14a, 16a brake actuators via front relay valves 18a, 18b and rear relay valves 20a, 20b. The braking pressures depend upon operating parameters of the vehicle determined, inter alia, by front and rear load sensors 22, 24, a vehicle decelerometer 26 and wheel speed sensors 28.

The EBS sets and controls braking pressures in response to drivers demands by the use of pressure control loops, one example of which is shown in FIG. 2a. This figure shows a typical pressure control loop 30 taking an electrical input signal D from the brake pedal transducer 10 which is used to provide a pressure error signal E by comparison with the output signal $P_1$ of a pressure transducer 32, this pressure error E forming the input to a computer based pressure controller 34 which generates an output signal causing the pressure developed by an electro-pneumatic or electrohydraulic converter 36 to change in a direction such as to reduce the amplitude of the pressure error E. The converter 36 is supplied by a pneumatic or hydraulic reservoir 38, as appropriate.

The nature and circuit of the pressure controller 34 depends upon the type of converter 36 employed. Two principal converter principles are well known, namely the analogue system in which a valve is employed with pressure output developed proportional to solenoid current and a digital system, as shown in FIG. 2a, in which a pair of simpler solenoid valves 38a, 38b is employed to raise or lower a control chamber pressure by selective energisation of these valves 38a, 38b. A preferred form of pneumatic converter employs a local relay valve 40 which responds to this control chamber pressure and which re-balances into the closed condition when the brake pressures at the brake actuators 42a, 42b for left and right hand brakes 44a, 44b become equal to said control pressure. Such a valve has an advantage in that the control chamber pressure responds rapidly to valve opening, giving a fast control loop which is accurate and responsive.

Figure 2B:
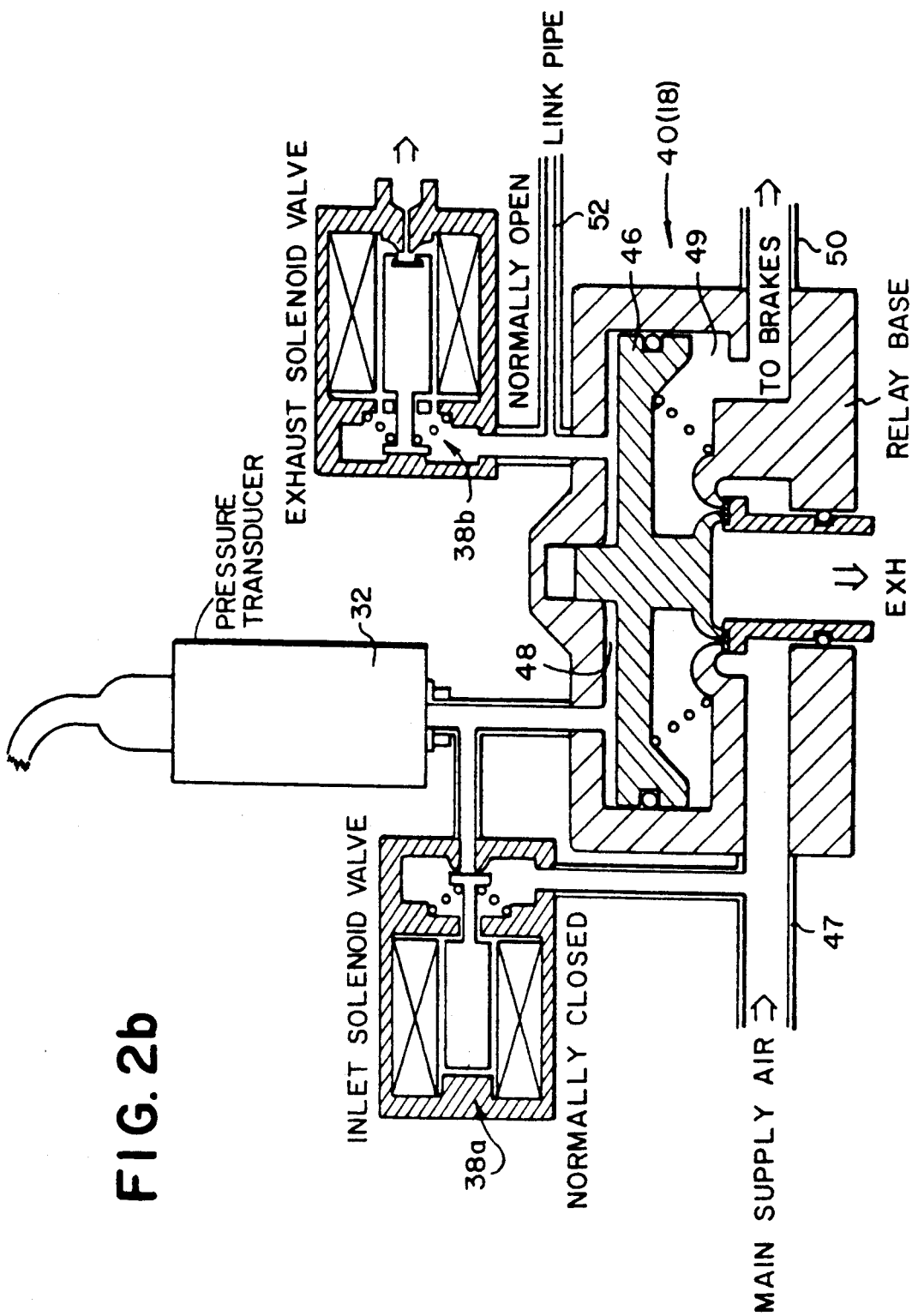
FIG. 2b shows a solenoid controlled relay valve as used in the present invention.

More detail of the preferred form of relay valve 40 is shown in FIG. 2b. The valve itself is conventional and has a piston 46 defining a control chamber 48 connected both to high speed inlet solenoid valve 38a and high speed outlet (exhaust) solenoid 38b and also to the pressure transducer 32. Air is supplied to the relay valve by an air supply line 47. The valve has an outlet control line 50 leading to the brakes. Displacement of the piston 46 downwardly (as viewed in FIG. 2b) causes air to be supplied from the reservoir 38 to the brakes via a chamber 49 and the control line 50 in a conventional manner. Actuation of the (normally closed) solenoid valve 38a causes air to be introduced to the control chamber 48 to apply the brakes and actuation of the (normally open) solenoid valve 38b causes air to be vented from the control chamber 48 to release the brakes.

The pressure loops which give individual control on the front wheels of some vehicles have to be protected by the controller 12 under anti-lock operation to prevent the sudden appearance of large braking pressure differences between the front wheels since this can give rise to a serious steering disturbance which may lead to loss of control. In the present system, in order to prevent failure conditions at one of the left or right braking channels causing the disturbance, the control chambers 48 of the relay valves 18a, 18b (40) are linked by a balance pipe 52 (see FIGS. 1 and 2b) designed to limit the pressure differential by allowing transfer of fluid from that one of the braking circuits which is at high pressure into the circuit which is still at low pressure. In the solenoid controlled relay valve of FIG. 2b, the preferred link pipe 52 is installed between the control chambers 48 of the two relay valves 18a, 18b, thereby allowing this pipe 52 to have a small bore consistent with the small control chamber volumes involved.

To permit individual pressure control on the two brakes at opposite ends of any axle, the link pipe 52 is arranged to be blocked off during any anti-lock pressure cycles to prevent enforced "select low" operation, which would reduce the efficiency of adhesion utilisation on any split adhesion surface encountered. This is achieved by installing in the link pipe an isolating valve 54 (FIG. 1) which is operated by a solenoid 56 to close off the link 52 as the first skid cycle takes place on the first wheel to skid.

The diameter of the link pipe 52 is carefully selected so that in the event of a failure of one pressure control channel, pressure balance can be approximately achieved so that wide departures of braking pressures and therefore braking torques are prevented, but sufficient differential pressure still remains to cause the failure to be detected, with the isolating valve 54 open, by the controller 12 on the first stop of any significance. If the link isolator 54 is incorporated within the body of the electro-pneumatic relay valve itself, it may be advantageous in keeping to a single design, to have an isolator valve in each relay valve 18a, 18b and to provide isolation at each end of the link pipe by energising both corresponding solenoids together. FIG. 1 shows a vehicle EBS layout with a single isolation valve 54 in the link pipe 52 on the front axle which is individually controlled at each wheel. If the vehicle being installed is very sensitive to differential rear braking, the individual wheel control of the rear axle could include a similar link pipe and isolating valve (not shown).

Preferably, the disablement of the link pipe 52 by the isolating valve or valves 54 is arranged to be prevented if a pressure control fault has been detected at either wheel by additional fault detection means. Thus, detection of a fault condition in the pressure control elements causes disablement of the isolating valve(s) solenoid(s) to prevent the link pipe itself being disabled under such conditions.

One possible means of detecting a fault condition in the pressure control elements 18 will now be described.

If the fault monitoring means to be described hereinafter, detect a channel fault, it is normal to continue operation of the axle pressure control means wherever possible and under these circumstances the balancing effect of the link pipe 52 is a valuable feature in assisting control of the vehicle. In such circumstances the normal isolating of the link pipe 52 during anti-lock operation will be arranged to be prevented and the "select low" operation of the axle (i.e. the adoption at both left and right channels of the control levels selected from that channel operating on that one of the left and right-hand wheels operating on a relatively low mu surface) will be selected in order to maintain vehicle stability.

In the pressure control systems discussed above the relay control chamber pressure is measured by the pressure transducer 32 which forms the feedback element. This is preferably a high output sensor to avoid the transmission of low level signals down the vehicle which would be prone to interference. The working voltage output is typically arranged to have a 2.5 v span and this is constrained to lie between 1 v and 3.5 v, although the output voltage which the sensor can generate will swing between 0.4 v and 4.5 v. The transducer zero point will be 1.0 v and full scale pressure level will never produce more than 3.5 v. Zero drift and span error extremes may extend the normal output voltage range to 0.7 v and 4.0 v so that between 0.4 v and 0.7 v and between 4.0 v and 4.5 v there exists two bands in which valid sensor outputs should never occur. The Controller measuring range of the controller 34 is arranged to cover 0 v to 4.5 v so that any voltage below 0.7 v or above 4.0 v is indicative of a sensor fault condition caused by excessive drift or a more serious malfunction.

Figure 3:
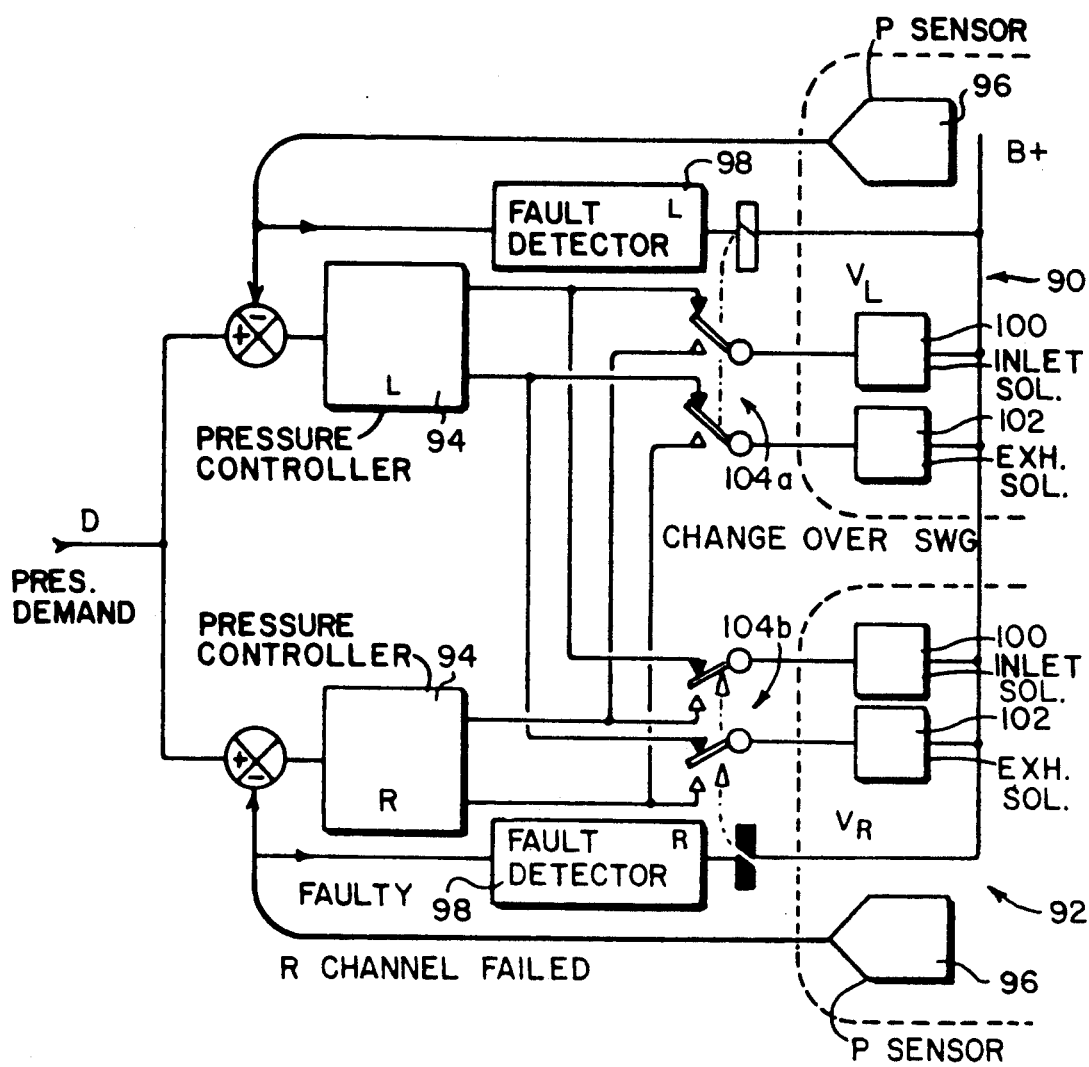
FIG. 3 illustrates the operation of a faulty channel as an open loop slave using control signals taken from a good channel.

The present system can be arranged so that detection of a pressure transducer fault, in a control scheme in which the two wheels on an axle have individually set braking pressures but are given common pressure demand signals, causes a switch in the control computer 12 to disconnect the loop which is faulty and drive the solenoid valves from the opposite channel signals i.e. the control loop which has a fully functional pressure transducer 32 as the feedback element. Thus, the resulting combination comprises one channel operated in closed loop from this local pressure feedback signal and the other channel operated as an open loop slave repeating the solenoid signals from the good channel. This arrangement is shown in FIG. 3 in block diagram form.

The pressure demand signal D is supplied to two identical circuits 90,92 corresponding to the left and right-hand brakes, respectively, of a given axle. Each circuit 90,92 includes a pressure controller 94 (corresponding to the pressure controller 34 of FIG. 2a), a pressure sensor 96, a fault detector 98, inlet solenoid valves 100 (corresponding to solenoid 38a of FIG. 2b) and exhaust solenoid valves 102 (corresponding to the solenoid 38b of FIG. 2b). Upon fault detection by one of the fault detectors 98, respective changeover switches 104a, 104b are actuated to switch over control of the inlet and exhaust solenoids to the pressure controller of the circuit 90,92 which does not include a fault. FIG. 3 shows the condition where the right-hand channel contains a fault arising from a faulty signal from sensor 96 and where the fault detector 98 for the right-hand channel is therefore actuated.

Valve responses are sufficiently repeatable to generate pressures which are in acceptable balance across the axle even without the link pipe feature, though of course with an open link pipe the pressure agreement is virtually faultless and such a link would never be isolated during the failed case described even if anti-lock operation was called for since this would be provided on a "select low" basis.

With the solenoid valve arrangement of FIG. 2b, the exhaust valve 38b is normally open and is energised to establish and hold pressure. Thus, at the end of a pressure cycling sequence when the brakes are fully released, the exhaust solenoid 38b is de-energised thereby allowing the control chamber 48 to exhaust and remain exhausted until the next brake application, thereby ensuring both left and right channels start at a zero pressure balance.

Figure 4:
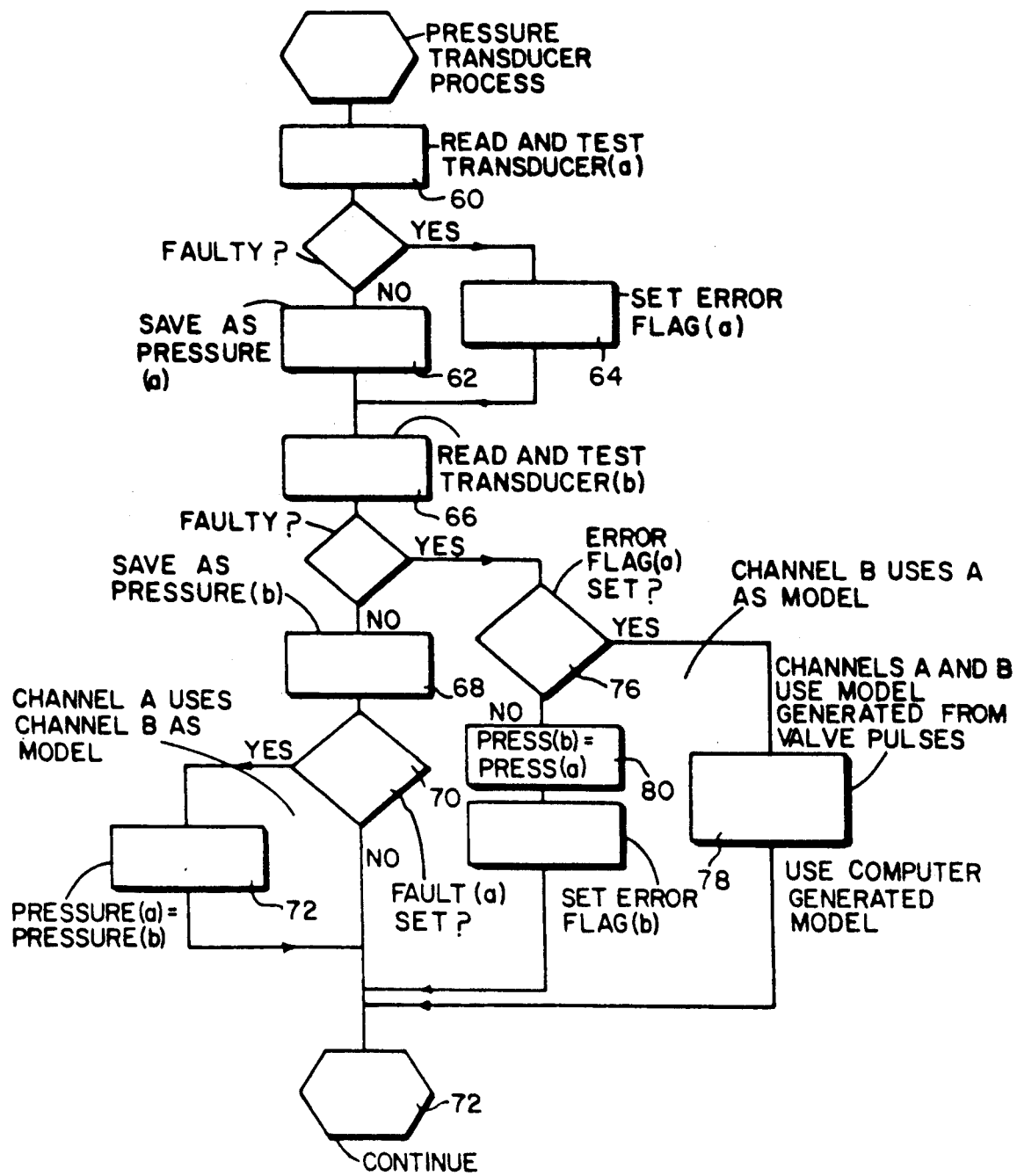
FIG. 4 is a flow chart showing the steps taken by a control computer to perform the control action changeover of FIG. 3.

A flow chart showing the basic steps taken by the control computer to perform the control action changeover of FIG. 3 is shown in FIG. 4.

The process begins by the first transducer 32 (transducer (a)) being read and tested (as described above) at 60. If the results of the test show that the reading is not faulty, then the result is saved at 62 as "pressure (a)". If the results of the test give a reading indicative of a fault condition, then an error flag (a) is set at 64. The second transducer 32 (transducer (b)) is then read at 66. If the reading shows no fault condition, then that reading is stored at 68 as "pressure (b)". If it is determined at 70 that flag (a) is not set, i.e. there is no fault condition at all, then the normal process proceeds at 72. However, if flag (a) was present, then the system selects at 74 for pressure (a) to be made equal to pressure (b), i.e. the system uses channel A as a model for channel B. If the reading at 66 did show a fault condition, then it is determined at 76 that error flag (a) is still set then both channels are faulty and it is selected at 78 that both channels A and B should be operated using models generated from valve pulses, i.e. a computer generated model is used for both channels. If it is determined at 76 that channel B is faulty but channel A is normal then it is selected at 80 that pressure (b) be equal to pressure (a), i.e. channel B uses channel A as a model.

Under normal operation of the Electronic Braking System on an axle, where there is no anti-lock action because no skidding occurs at either wheel, the pressure demand signals are substantially equal and a comparison of the pressure transducer feedback signals will yield good agreement between wheel braking pressures. If such agreement does not occur, the differences are indicative of faulty valve or sensor operation and can be detected when greater than a preset level to annunciate a dynamic or steady state fault condition.

Fault conditions which are detected by pressure differential error are those associated with serious faults in the pressure sensor and which therefore result in a failure to respond to pressure changes or provide a serious response which causes problems within the control loop or, as is more likely, faults in the control valve responses which prevent control chamber pressure build-up or fall.

For example, an inlet solenoid valve (38a) failing to operate or being blocked by debris will generate a protracted pressure error which will rapidly be detected in comparison with the much lower or zero error of the opposite wheel channel which operates correctly and responds quickly to the demand signal. There will be an initial transient error which is converted into a serious static error if there is no pressure building up in the faulty channel. Even a partial blockage will generate a short pressure differential error indicating a slow response and would be detected as a fault which requires attention as soon as possible.

An exhaust valve (38b) which will not seat properly will present a continual leakage on the control chamber 48 and pressure build up will be consequently slowed, generating a transient pressure error as the first indication. However, this fault will produce a continuous pulsing of the inlet valve to restore control chamber pressure and this will be detected by comparison of the pressure as predicted by a model of the valve performance compared with the sensor pressure as described hereinafter.

We claim:

1. In a vehicle braking system in which a respective electronically controlled pressure adjustment channel having a local pressure control element is provided for each wheel, the improvement wherein, for avoiding serious brake unbalance under fault conditions which would cause either loss of braking or excessive braking at one wheel, a link pipe means connects the pressure control elements of the respective brake circuits associated with the two wheels at opposite ends of an axle whereby the pressure control elements are influenced in such a manner that a correctly functioning channel attempts to influence a faulty channel in such a direction as to reduce the pressure unbalance.

2. A vehicle braking system according to claim 1 including at least one isolating valve within said link pipe means, said isolating valve being operable by a solenoid so that, in the event of skidding being detected, said solenoid can be signalled to disable the link pipe means by means of the isolating valve and allow individual control of braking pressure at each wheel.

3. A vehicle braking system according to claim 2, in which said link pipe means is equipped with two said solenoid operated isolating valves, one adjacent each end thereof.

4. A vehicle braking system according to claim 2, including means for preventing the disablement of the link pipe means by said at least one isolating valve during any braking operation if a pressure control fault has been detected at either wheel by additional fault detection means.

5. A vehicle braking system according to claim 1, wherein said link pipe means has an internal diameter which is selected to provide a restriction to fluid flow therethrough such that control element failure will generate a detectable difference in braking input when a failure exists at one of the braking control channels.

6. In a vehicle braking system of the type in which a respective electronically controlled pressure adjustment channel having a local pressure control element in the form of a solenoid actuated relay valve is provided for each wheel, the improvement wherein, for avoiding serious brake unbalance under fault conditions which would cause either loss of braking or excessive braking at one wheel, a small bore link pipe connects the control chambers of the relay valves of the respective brake circuits associated with the two wheels at opposite ends of an axle whereby the relay valves are influenced in such a manner that a correctly functioning channel attempts to influence a faulty channel in such a direction as to reduce the pressure unbalance.

7. A vehicle braking system according to claim 6 including at least one isolating valve within said small bore link pipe, said isolating valve being operable by a solenoid so that, in the event of skidding being detected, said solenoid can be signalled to disable the link pipe by means of the isolating valve and allow individual control of braking pressure at each wheel.

8. A vehicle braking system according to claim 7, in which said small bore link pipe is equipped with two said solenoid operated isolating valves, one adjacent each end thereof.

9. A vehicle braking system according to claim 7 including means for preventing the disablement of the link pipe by said at least one isolating valve during any braking operation if a pressure control fault has been detected at either wheel by additional fault detection means.

10. A vehicle braking system according to claim 6, wherein said small bore link pipe has an internal diameter which is selected to provide a restriction to fluid flow therethrough such that control element failure will generate a detectable difference in braking input when a failure exists at one of the braking control channels.

* * * * *